United States Patent Office 3,830,823
Patented Aug. 20, 1974

3,830,823
PROCESS FOR THE PREPARATION OF DEETHYLEBURNAMONINES
Albert René Castaigne, Toulouse, France, assignor to Centre d'Etudes pour l'Industries Pharmaceutique, Toulouse, France
Filed Jan. 15, 1973, Ser. No. 323,429
Claims priority, application France Jan. 24, 1972, 7202196
Int. Cl. C07d 57/04
U.S. Cl. 260—293.53
4 Claims

ABSTRACT OF THE DISCLOSURE

This invention relates to a process for the preparation of d,l - 12-oxo-1,2,5,6,12,13,13a,13b-octahydro-3H-indolo[3,2,1-d,e]pyrido[3,2,1-i,j][1,5]naphthyridines, comprising reacting 2,3,4,6,7,12-hexahydro-indolo(2,3-a)quinolizine with an alkyl haloacetate, reacting the resulting compound with perchloric acid, to give ethyl 1-[1,2,3,4,6,7-hexahydro-indolo(2,3-a)quinolizinium] acetate perchlorate, and then cyclizing and reducing the resulting perchlorate.

---

This invention relates to a process for the preparation of deethyleburnamonines which are vincamine derivatives.

Said derivatives, d,l-12-oxo-1,2,5,6,12,13,13a,13b-octahydro - 3H - indolo[3,2,1-d,e]pyrido[3,2,1-i,j][1,5]naphthyridines, corresponding to the following structural formula:

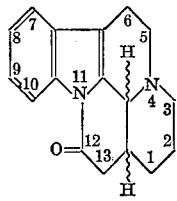

(I)

occur in the form of stereoisomers, namely: d,l-deethylepieburnamonine, trans derivative, and d,l-deethyleburnamonine, cis derivative.

Said compounds, in view of their therapeutic properties, are useful as regulators of the cerebral circulation. They may also be used as intermediates for the synthesis of other useful compounds.

It is contemplated, according to this invention, to provide a process by which one or the other of the aforesaid diastereoisomers may be obtained.

The process according to this invention, for the preparation of d,l-12-oxo-1,2,5,6,12,13,13a,13b-octahydro-3H indolo[3,2,1-d,e]pyrido[3,2,1-i,j][1,5]naphthyridines, comprises reacting 2,3,4,6,7,12 - hexahydro-indolo(2,3-a) quinolizine of the formula

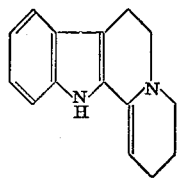

(II)

with an alkyl haloacetate, and then reacting the resulting compound with perchloric acid, to give alkyl 1-[1,2, 3,4,6,7 - hexahydro - indolo(2,3-a)quinolizinium]acetate perchlorate having the formula

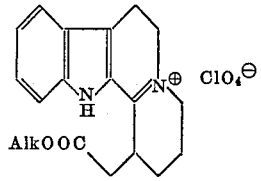

(III)

and then cyclizing and reducing the resulting perchlorate.

According to another feature of the invention, the derivative of the formula (III) is first cyclized and the resulting cyclized derivative having the formula

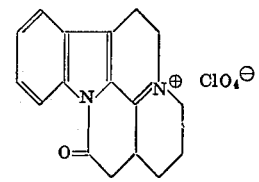

(IV)

is then reduced, to give the trans isomer: d,l-deethylepieburnamonine having the formula

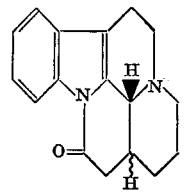

(V)

According to a further feature of the invention, the derivative of the formula (III) is first reduced, to give a compound of the formula

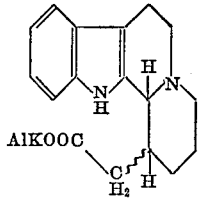

(VI)

which is then cyclized, to give the cis isomer: d,l-deethyleburnamonine, having the formula

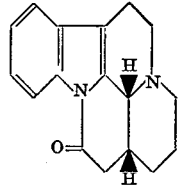

(VII)

Other features of the invention will be aparent from the ensuing description.

The starting 2,3,4,6,7,12 - hexahydro-indolo(2,3-a) quinolizine is a known compound, the synthesis of which was described by R. N. Schut and T. J. Leipzig (Journal of Heterocyclic Chemistry, 1966, 3, 101).

The reaction with the alkyl haloacetate is preferably conducted under an inert gas atmosphere, such as nitrogen for example.

Ethyl iodoacetate is advantageously used as haloacetate.

The resulting compound is reacted, advantageously as a solution in an alcoholic solvent, particularly methanol, with concentrated perchloric acid. The precipitated perchlorate of the formula (III) thus formed is then recovered.

When it is desired to obtain the *trans* isomer, cyclization between C and N at positions 12 and 11, respectively, is first effected with hydrochloric acid. The resulting cyclized product is then reduced (C=N double bond) with a conventional reducing agent, for example with an alkali metal borohydride such as sodium borohydride in alcohol medium, methanol for example, or by catalytic reduction with hydrogen in the presence of a hydrogenating catalyst (particularly a palladium or platinum catalyst).

When it is desired to obtain the *cis* isomer, reduction is first carried out in the manner described above, after which the resulting reduced compound is cyclized by means of an alkali metal alkoxide such as sodium ethoxide in alcohol medium, particularly methanol.

The following non limiting examples are given to illustrate the invention.

EXAMPLE 1

(1) Preparation of ethyl 1-[1,2,3,4,6,7-hexahydro-indolo-(2,3-a)quinolizinium]acetate perchlorate In a three-necked 100 ml. flask provided with a thermometer, a magnetic stirring device and a cooler connected with a nitrogen inlet, are added 40 ml. ethyl iodoacetate. While cooling over an ice bath, 2,3,4,6,7,12-hexahydro-indolo(2,3-a)quinolizine (13.4 g.; 0.0597 mole) is added thereto portionwise, under a nitrogen stream. The reaction mixture is allowed to cool to room temperature and is then heated at 95-100° C. during 4 hours. It is then allowed to cool, pentane (100 ml.) is added thereto, after which the reaction mixture is triturated and the pentane is decanted off. Said washing procedure is repeated several times.

The residue, in the form of a firm brown paste, is dissolved in methanol (100 ml.). The solution is cooled with an ice-salt mixture and 70% perchloric acid (8.6 ml.; 0.0597 mole) is then added dropwise thereto, with vigorous stirring.

A yellow crystalline precipitate is found to occur after a few minutes. On completion of the addition, stirring is continued for a further 5 minutes and the resulting microcrystals are filtered off, to give 18.2 g. of the desired perchlorate having a melting point (Koefler block) of 180–181° C. (Yield 74%.)

(2) Preparation of d,l-deethylepieburnamonine (*trans* isomer)

In a 1 litre flask, provided with a magnetic stirring device and a cooler connected with a nitrogen inlet, are added the perchlorate obtained under (1) above (15 g.; 0.0365 mole) and 4N hydrochloric acid (450 ml.).

The mixture is refluxed during 5 hours (complete dissolution is noted after refluxing for a few minutes), and is then evaporated to dryness, to give the above mentioned derivative of the formula (IV), melting above 260° C., and which is used without purification in the next step.

This derivative is partly dissolved in methanol (600 ml.), it is cooled externally by means of an ice bath and sodium borohydride (7 g.) is added thereto in 0.5 g. portions. Dissolution is then complete. Stirring is continued a further hour at room temperature; the reaction mixture is made slightly acidic with acetic acid and is then made alkaline with 3% ammonia. The mixture is extracted with methylene chloride; the organic layer is separated, washed with water, dried and evaporated. The residue (7.35 g.) is chromatographed over a silica column (350 g.; eluent: chloroform-methanol 9:1). After evaporation, the first 500 ml. of eluate give a crystalline material (4.15 g.) which is purified by recrystallization from methanol, to give 3.35 g. d,l-deethylepieburamonine (m.p.=138–139° C.). Yield, on the basis of the perchlorate: 34.5%.

A much higher yield may be obtained (77%) by using a perchlorate purified by recrystallization from methanol (m.p.=186–188° C.).

EXAMPLE 2

Preparation of d,l-deethyleburnamonine (*cis* isomer)

In a 1 litre flask, provided with a cooler and a magnetic stirring device, are dissolved 6.9 g. (0.0168 mole) of the perchlorate obtained as described under (1) in Example 1, in 500 ml. methanol. Sodium borohydride (4.15 g.) is added thereto in 500 mg. portions, while cooling. The reaction mixture is stirred during 30 minutes at room temperature and then 10 minutes under reflux, after which it is allowed to return to room temperature and about 400 ml. methanol are removed by evaporation; water (500 ml.) is then added and the resulting material is made slightly acidic with acetic acid and is then made alkaline with ammonia and extracted with methylene chloride. The organic layer is separated, dried over sodium sulfate and evaporated, to give 5.35 g. of crude ester of aforementioned formula (VI) which is used directly in the next step.

The ester obtained above is dissolved in an ethanol solution of sodium ethoxide (0.1N; 460 ml.), in a 1 litre flask provided with a magnetic stirring device and a cooler (calcium chloride trap).

The solution is refluxed during 5 minutes and is allowed to cool during 15 minutes. After evaporation of about 400 ml. ethanol, it is made slightly acidic with acetic acid, and is then made alkaline with ammonia. Water is added thereto, and it is extracted with methylene chloride. The organic layer is separated, dried over sodium sulfate and evaporated. The crude product (4.15 g.) solidifies on treatment with ether (30 ml.), to give a powder (2.5 g.) which is recrysallized from isopropanol. 1.4 g. of the *cis* isomer of d,l-deethyleburnamonine (m.p. 155° C.) are thus obtained. Yield with respect to the perchlorate: 31%.

Having now described my invention what I claim as new and desire to secure by Letters Patent is:

1. Process for the preparation of trans-d,l-12-oxo-1,2,5,6,12,13,13a,13b - octahydro-3H indolo[3,2,1-d,e]pyrido-[3,2,1-i,j]-[1,5]naphthyridine having the formula

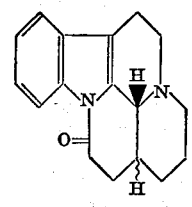

(V)

comprising reacting 2,3,4,6,7,12-hexahydro-indolo(2,3-a) quinolizine having the formula

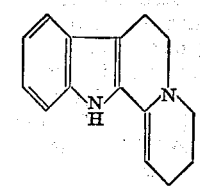

(II)

with an alkyl halocetate, reacting the resulting compound with perchloric acid, to give alkyl 1-[1,2,3,4,6,7-hexahydro - indolo(2,3-a)quinolizinium]acetate perchlorate having the formula

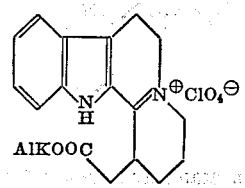

(III)

cyclizing with 4N hydrochloric acid the derivative of formula (III) and reducing the resulting cyclized derivative, having the formula

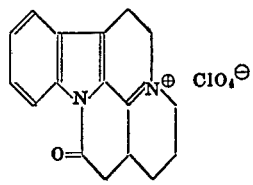

(IV)

to give the *trans* isomer: *d,l*-deethylepieburnamonine.

2. Process as claimed in claim 1, wherein the reduction is effected with an alkali metal borohydride in alcohol medium.

3. Process as claimed in claim 2, wherein the borohydride is sodium borohydride within methanol.

4. Process as claimed in claim 1, wherein the reduction is effected by catalytic hydrogenation.

References Cited

Wenkert et al., J. Am. Chem. Soc. 87 (7), 1580–9 (1965).

G. THOMAS TODD, Primary Examiner

U.S. Cl. X.R.

424—267